(12) United States Patent
Dvorkis et al.

(10) Patent No.: US 7,025,271 B2
(45) Date of Patent: Apr. 11, 2006

(54) IMAGING OPTICAL CODE READER HAVING SELECTABLE DEPTHS OF FIELD

(75) Inventors: Paul Dvorkis, East Setauket, NY (US); Alex Breytman, Bellmore, NY (US); Mark Krichever, Hauppauge, NY (US); Brad Carlson, Northport, NY (US); Tsi David Shi, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/405,812

(22) Filed: Apr. 2, 2003

(65) Prior Publication Data

US 2004/0118918 A1    Jun. 24, 2004

Related U.S. Application Data

(60) Provisional application No. 60/434,519, filed on Dec. 18, 2002.

(51) Int. Cl.
*G02B 26/08* (2006.01)
*G06K 7/10* (2006.01)

(52) U.S. Cl. .................. 235/462.22; 235/454
(58) Field of Classification Search ........... 235/462.22, 235/462.23, 472.01, 462.24, 462.45
See application file for complete search history.

(56) References Cited

U.S. PATENT DOCUMENTS 3,812,459 A    5/1974    MacNeill et al.
4,251,798 A    2/1981    Swartz et al.
4,877,949 A    10/1989   Danielson et al.
5,192,856 A    3/1993    Schaham
5,210,398 A    5/1993    Metlitsky
5,308,966 A *  5/1994    Danielson et al. ..... 235/462.23
5,365,049 A *  11/1994   Peng ..................... 235/462.22
5,397,885 A    3/1995    Massieu et al.
5,414,251 A    5/1995    Durbin
5,414,461 A    5/1995    Kishi et al.
5,561,283 A    10/1996   Dvorkis et al.
5,641,958 A *  6/1997    Rudeen ..................... 250/235
5,796,089 A    8/1998    Marom
5,920,060 A    7/1999    Marom
6,066,857 A *  5/2000    Fantone et al. ............. 250/566
6,123,264 A    9/2000    Li et al.
6,179,208 B1*  1/2001    Feng ..................... 235/472.01
6,247,647 B1   6/2001    Courtney et al.
6,336,587 B1   1/2002    He et al.
6,340,114 B1   1/2002    Correa et al.
6,431,452 B1   8/2002    Feng (Continued)

FOREIGN PATENT DOCUMENTS

DE    41 42 701 A1    12/1991

(Continued)

*Primary Examiner*—Daniel Stcyr
*Assistant Examiner*—Daniel A. Hess
(74) *Attorney, Agent, or Firm*—Carter, DeLuca Farrell & Schmidt, LLP

(57) ABSTRACT

Several optical systems for imaging engines of imaging optical code readers are disclosed. Each optical system includes the abilities to change the depth of field of the imaging field and to adjust a focus quality of the imaging field. The disclosed structures for changing the depth of field of the disclosed optical systems allow for the automatic or manual selection of one of a plurality of depths of field.

26 Claims, 12 Drawing Sheets

U.S. PATENT DOCUMENTS

| | | |
|---|---|---|
| 6,437,900 B1 | 8/2002 | Cornelissen et al. |
| 6,689,998 B1 * | 2/2004 | Bremer .................... 250/201.2 |
| 6,729,541 B1 * | 5/2004 | Kurokawa et al. .......... 235/454 |
| 2002/0008139 A1 * | 1/2002 | Albertelli .................... 235/385 |
| 2002/0148900 A1 | 10/2002 | Gurevich et al. |

FOREIGN PATENT DOCUMENTS

| | | |
|---|---|---|
| WO | 94/27172 | 11/1994 |
| WO | 01/29836 A1 | 4/2001 |
| WO | 02/44790 A1 | 6/2002 |

\* cited by examiner

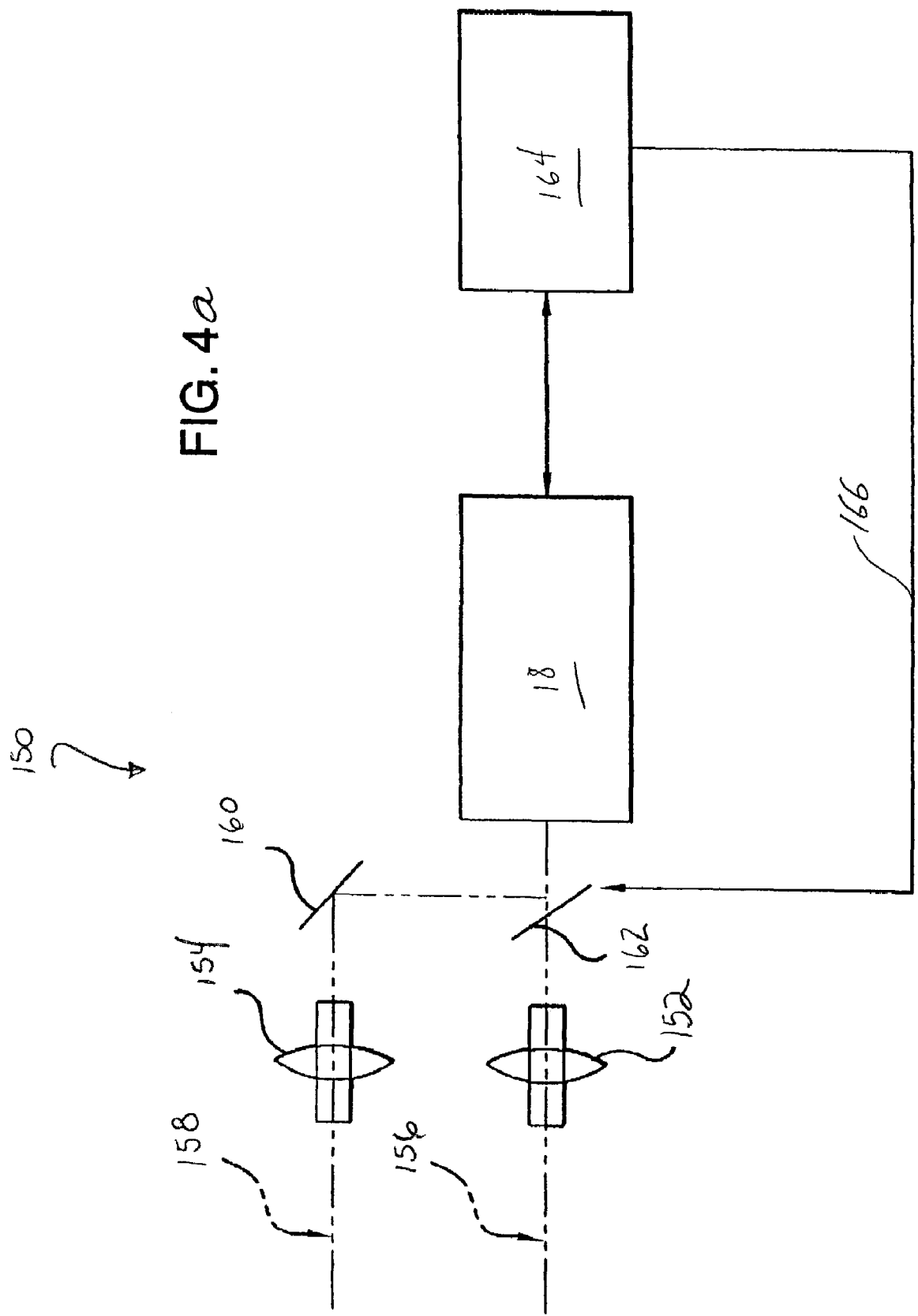

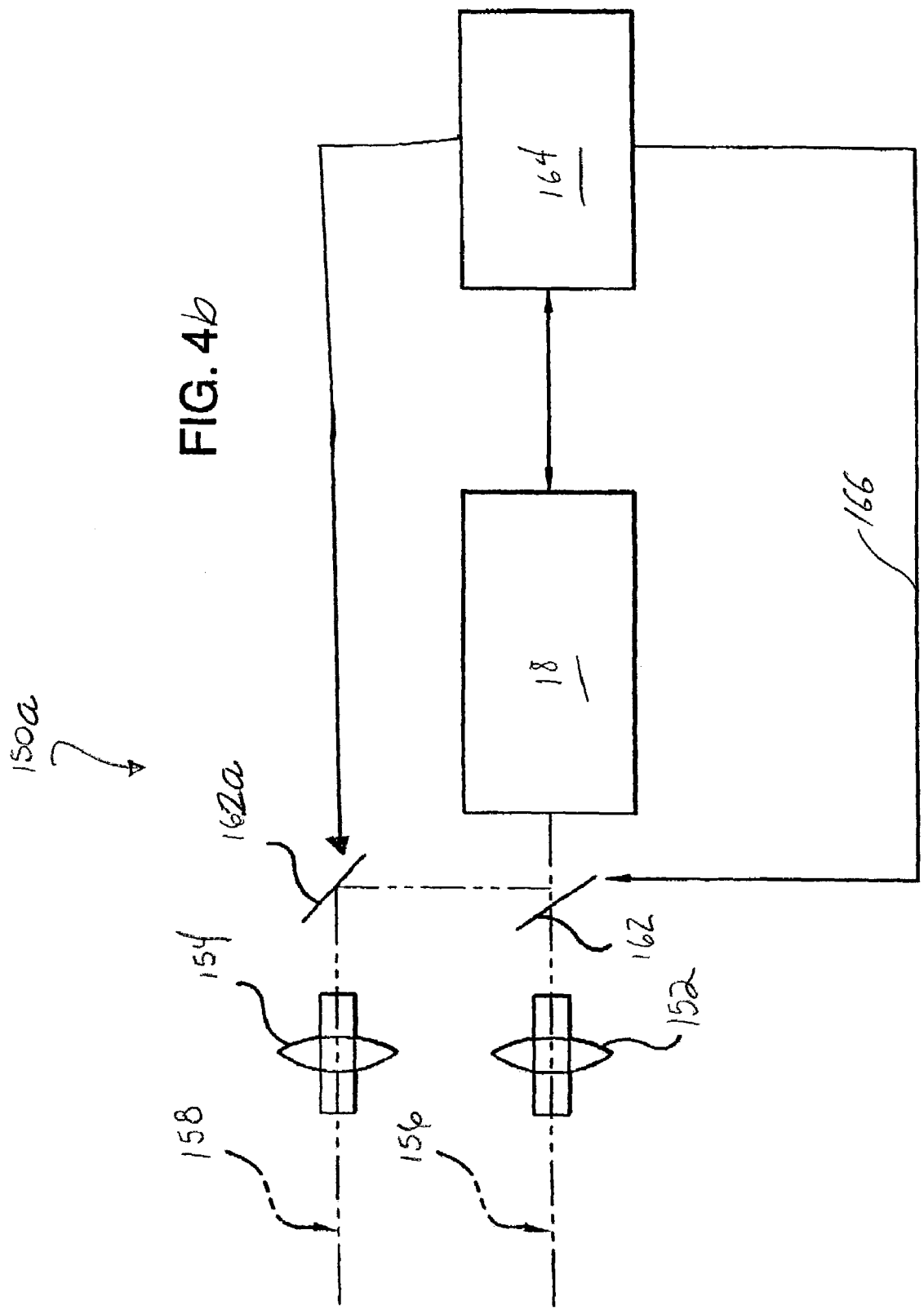

IMAGING OPTICAL CODE READER HAVING SELECTABLE DEPTHS OF FIELD

PRIORITY

This application claims priority to a U.S. Provisional Application filed on Dec. 18, 2002 and assigned U.S. Provisional Application Ser. No. 60/434,519, the contents of which are incorporated herein by reference.

BACKGROUND OF THE INVENTION

1. Field of the Invention

This invention relates to imaging in optical code reading devices. Aspects of the invention are particularly useful in solid state, area image sensor based, handheld code readers that are positioned at variable orientations and distances with respect to a target code.

2. Description of the Related Art

Optical code readers are used in fixed or portable installations in many diverse environments such as in stores for checkout services, in manufacturing locations for workflow and inventory control and in transport vehicles for tracking package handling. The optical code can be used as a rapid, generalized means of data entry, for example, by reading a target barcode from a printed listing of many barcodes. In some uses, the optical code reader is connected to a portable data processing device or a data collection and transmission device. Frequently, the optical code reader includes a handheld sensor that is manually directed at a target code.

Most conventional optical scanning systems are designed to read one-dimensional barcode symbols. The barcode is a pattern of variable-width rectangular bars separated by fixed or variable width spaces. The bars and spaces have different light reflecting characteristics. One example of a one-dimensional barcode is the UPC/EAN code used to identify, for example, product inventory. An example of a two-dimensional or stacked barcode is the PDF417 barcode. Another conventional optical code is known as "MaxiCode." It consists of a central finder pattern or bull's eye center and a grid of hexagons surrounding the central finder.

It is noted that the aspects of the inventions disclosed herein are applicable to optical code readers, in general, without regard to the particular type of optical codes which they are adapted to read. The invention described may also be applicable to some associated image recognition or analysis.

Most conventional scanning systems generate one or more beams of laser light, which reflects off a barcode symbol, and back to the scanning system. The system obtains a continuous analog waveform corresponding to the light reflected by the code along one or more scan lines of the system. The system then decodes the waveform to extract information from the barcode. A system of this general type is disclosed, for example, in U.S. Pat. No. 4,251,798, assigned to Symbol Technologies, Inc. A beam scanning system for detecting and decoding one and two-dimensional barcodes is disclosed in U.S. Pat. No. 5,561,283 also assigned to Symbol Technologies, Inc.

Barcodes can also be read employing imaging devices. For example an image sensor may be employed which has a two dimensional array of cells or photo sensors which correspond to image elements or pixels in a field of view of the device. Such an image sensor may be a two-dimensional or area charge coupled device (CCD) and associated circuits for producing electronic signals corresponding to a two-dimensional array of pixel information for a field of view.

Such scanning systems are deployed in handheld units that may be manually pointed at the target. Often an individual scanner is a component of a much larger system including other scanners, computers, cabling, data terminals, etc. Such systems are frequently designed and constructed based on mechanical and optical specifications for the scanning engine, sometimes called "form factors." One such form factor is the SE1200 form factor designed by Symbol Technologies, Inc.

Optical codes can also be read by employing optical code readers having an imaging engine. An imaging engine includes an image sensor having a two-dimensional array of cells or photo sensors, such as an area charge coupled device (CCD), which correspond to image elements or pixels in a field of view of the imaging engine. The imaging engine further includes a lens assembly for focusing light incident on the image sensor and associated circuitry coupled to the image sensor.

The associated circuitry produces electronic signals corresponding to a two-dimensional array of pixel information for the field of view. The electrical signals are processed for extracting information indicative of the focus quality of an image corresponding to the field of view.

An object of the present invention is to provide a more versatile optical code reader than prior art optical code readers.

It is an object of the present invention to provide a simple and inexpensively fabricated optical system for an optical code imaging engine having structure for providing more than one depth of field.

It is another object of the present invention to provide an imaging engine having an image modification assembly for changing the depth of field of an image in accordance with a determined focus quality for adjusting the image quality of an imaging optical code reader.

It is another object of the present invention to provide an imaging engine which can be substituted for conventional laser line scanning engines, in currently designed and currently deployed optical code reader systems and which includes structure for providing more than one depth of field to increase the reliability, versatility, and target working range of such systems.

It is another object of the present invention to provide an imaging optical code reader having an image modification assembly for providing more than one depth of field.

It is another object of the present invention to provide an imaging optical code reader having an image modification assembly for providing a plurality of selectable depths of field appropriate to the signal processing and decoding capabilities of the reader.

SUMMARY OF THE INVENTION

The present invention provides several embodiments of optical systems for imaging engines of imaging optical code readers. Each optical system includes the ability to change the depth of field of the imaging field and to adjust focus quality of the imaging field. In cooperation with the optical system in each embodiment is a processing unit that determines which, if any, of theses measures need to be taken in real-time.

In particular, the present invention relates to an imaging engine for optical code readers, especially imaging optical code readers having a hard-wired or wireless connection to a base terminal or other computing device. The imaging engine includes an optical system and structure for changing the depth of field of the optical system. The disclosed structures for changing the depth of field of the optical system allow for the automatic or manual selection of one of a plurality of depths of field.

In the various embodiments of the present invention, a processor that is operatively coupled to an image focusing assembly and/or an image modification assembly may be included for determining and selecting the desired depth of field and focus quality of the image. Preferably, the processor provides a real-time response to a read or misread of the target indicia.

In one embodiment of the present invention, an imaging engine for an optical code reader includes an image modification assembly having an optical wedge moveably positioned between an object to be imaged and an optical lens assembly of the imaging engine. The optical wedge includes two or more thicknesses each corresponding to a different depth of field when aligned with an input optical axis of the lens assembly.

The optical wedge is automatically or manually moveable in a transverse or crosswise direction with respect to the input optical axis of the lens assembly for aligning a particular thickness of the wedge with the input optical axis of the lens assembly. The optical wedge is preferably moveable by a manual action, such as depression of the trigger of the imaging optical code reader, or the use of a depth of field selector switch mechanically connected to the optical wedge.

In another embodiment, an imaging engine for an optical code reader includes an adjustable aperture assembly having a central axis of an adjustable aperture in alignment with the input optical axis of an optical lens assembly of the imaging engine. The diameter of the aperture is automatically or manually changeable for selecting a different depth of field. The smaller the diameter of the aperture, the longer the depth of the field, and vice versa.

It is noted that when the diameter of the aperture is smaller, more illumination is required for producing the desired image. The diameter is preferably changeable by a manual action, such as depression of the trigger of the imaging optical code reader, or the use of a diameter selector switch mechanically associated with the adjustable aperture assembly.

In another embodiment of the present invention, an imaging engine for an optical code reader includes first and second lens assemblies, each lens assembly having a different depth of field. The lens assemblies may be compound lenses made up of multiple lens elements aligned on the same optical axis. The lenses themselves may include inexpensive molded plastic spherical lens elements. The lens elements may be snap fit in an alignment tube or barrel to maintain the lenses in position on a common optical axis in back-to-back relationship.

This embodiment further includes an electronic mirror or optical element for selectively providing an image to the image sensor through one of the first or the second lens assemblies. The electronic mirror is positioned in a first input optical axis and is controlled by a voltage control signal. When the voltage control signal is at a first voltage, the electronic mirror is in a transmissive state for providing the image to the image sensor through the first lens assembly. Accordingly, when the voltage control signal is at a second voltage, the electronic mirror changes into a reflective state for providing the image to the image sensor through the second lens assembly. A further embodiment includes two electronic mirrors controlled by control and logic circuitry. Both electronic mirrors change state simultaneously from a transmissive state to a reflective state in response to changes in the control voltage from the control and logic circuitry.

BRIEF DESCRIPTION OF THE DRAWINGS

Various embodiments of the invention will be described herein below with reference to the figures wherein:

FIG. 4a illustrates a block diagram of one embodiment of a switchable lens assembly in accordance with the present invention;

FIG. 4b illustrates a block diagram of another embodiment of a switchable lens assembly in accordance with the present invention.

DETAILED DESCRIPTION OF THE PREFERRED EMBODIMENTS

Several embodiments of the subject invention are hereby disclosed in the accompanying description in conjunction with the several figures. Advantageously, each of the embodiments of the subject invention may be adapted to substitute for a scanning engine having a predetermined form factor, such as the SE900 and SE1200 form factor scanning engines.

Figure 1A:
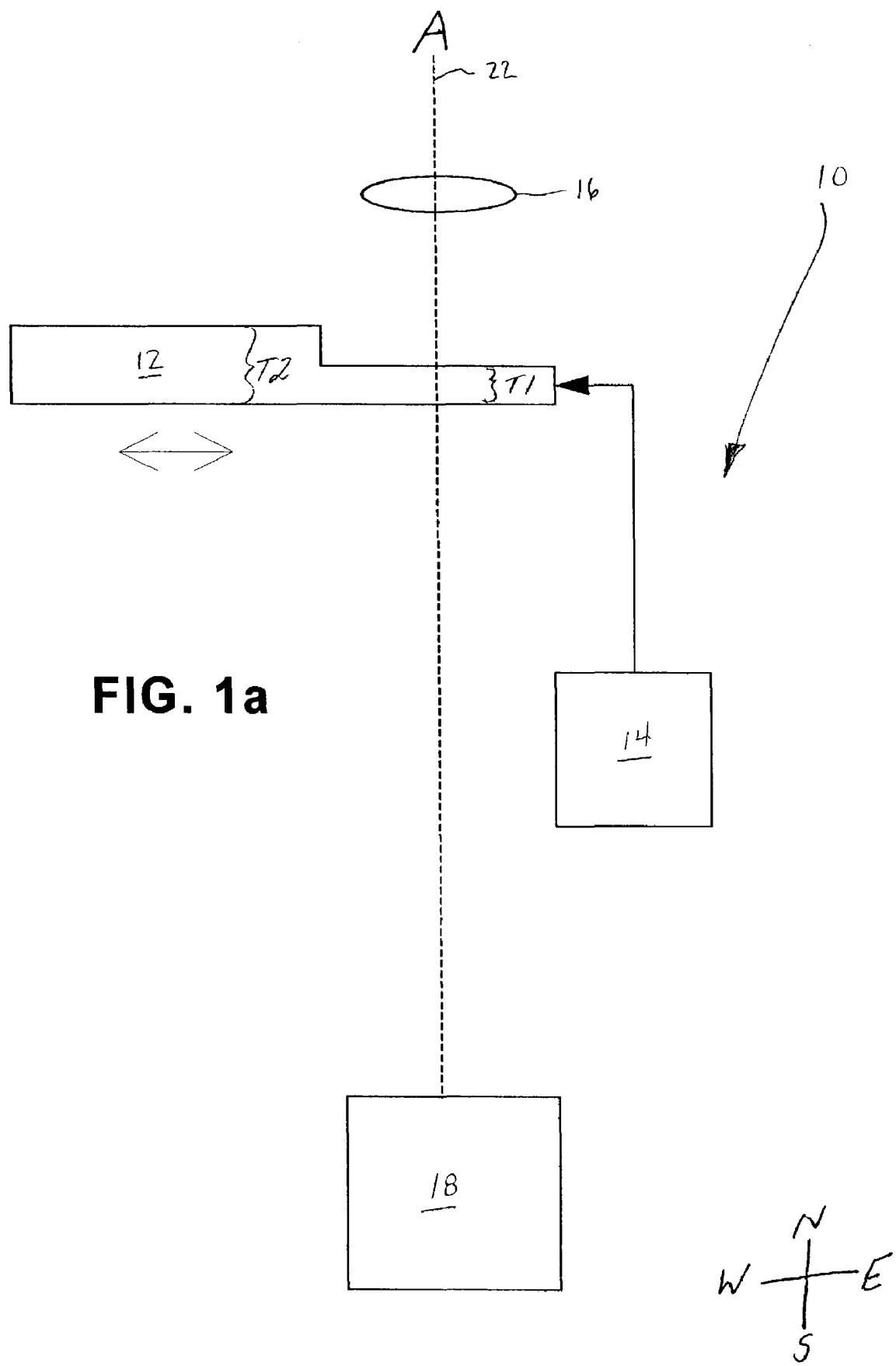
FIGS. 1a, 1b, 1c and 1d depict top plan views of components of an imaging engine in accordance with various embodiments of the present invention.

In a first embodiment shown in FIG. 1a, an optical system 10 of an imaging engine includes an image modification assembly having an optical wedge 12 having two different thicknesses disposed between the image sensor 18 and the optical element 16. An optical beam path 22 or input optical axis defines a longitudinal axis of the optical system. The optical wedge 12 is moveable in a transverse direction with respect to the optical beam path 22 between at least two positions for defining the depth of field of the imaging field.

Each selectable position corresponds to a particular thickness of the optical wedge 12 and aligns the selected thickness of the optical wedge 12 with the optical beam path 22. More specifically, the first thickness ("T1") of the optical wedge 12 corresponds to a first position and defines a near depth of field, while the second thickness ("T2") of the optical wedge 12 corresponds to a second position and defines a far depth of field.

Figure 1B:
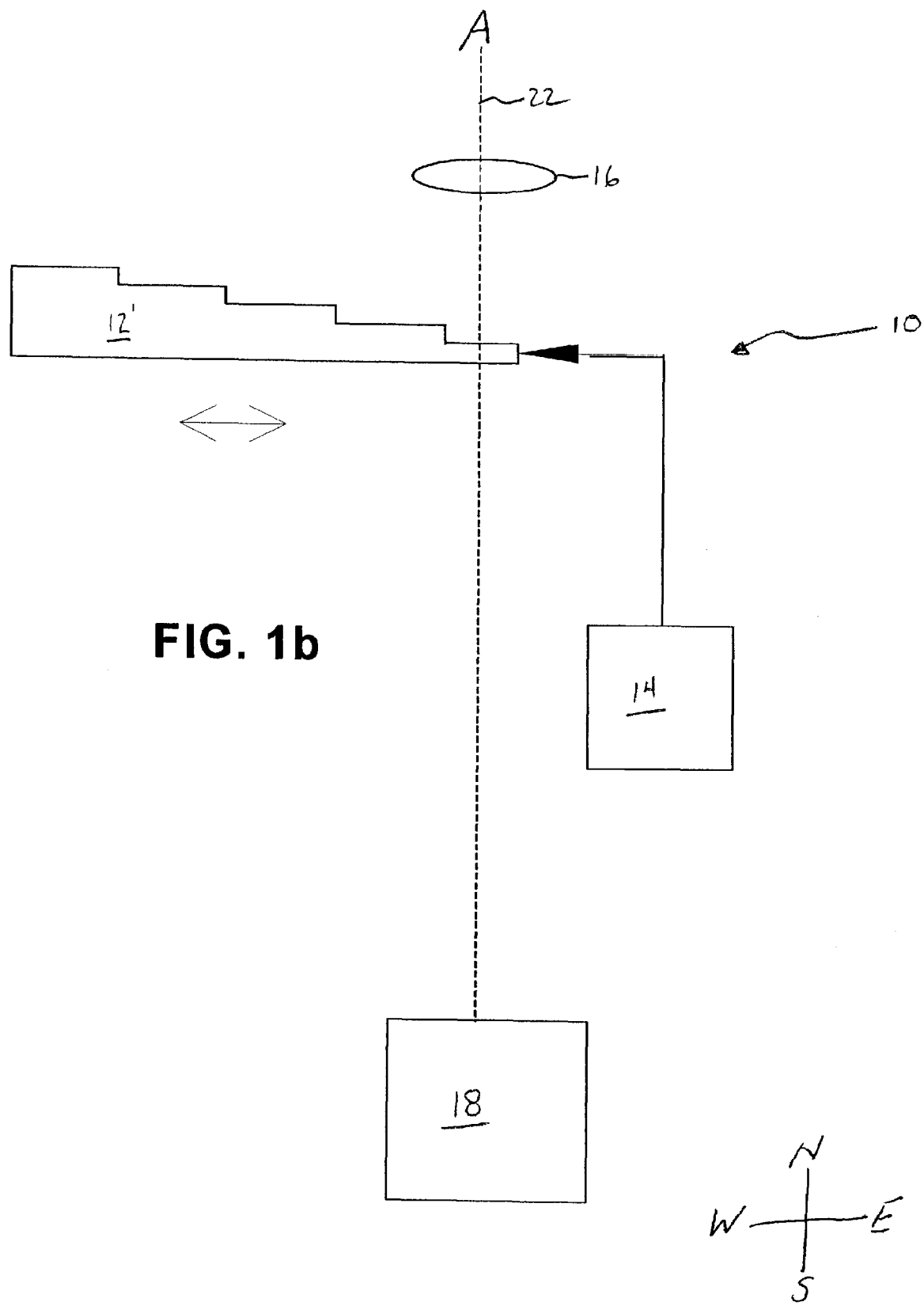

Further, each position of the optical wedge 12 changes the magnification of the imaging field relative to its particular thickness. FIG. 1b illustrates a similar embodiment as the embodiment of FIG. 1a, except that a wedge 12' substitutes the wedge 12. The wedge 12' has a plurality of thicknesses each corresponding to a different depth of field for switching between one of a plurality of depths of field for readily imaging and decoding an optical code.

In FIGS. 1a and 1b, an actuator 14 is adapted to move the optical wedge 12, 12' to change the position of the optical wedge 12, 12' in relation to the optical beam path 22. The actuator 14 enables selection of one of the thicknesses of the optical wedge 12, 12' at any given time. The actuator 14 is preferably moveable automatically or by a manual action.

In a manual mode of operation, the actuator 14 is the optical code reader's trigger or a component in operative communication with the trigger, such that depression of the trigger of the imaging optical code reader causes the optical wedge 12, 12' to move, if so desired. The actuator 14 can further be a depth of field selector switch, as described below with reference to FIGS. 5a and 5b, mechanically connected to the optical wedge 12, 12'.

In operation, light reflected from an external optical code (see "A" in FIGS. 1a–1d) defines an image that passes through the optical element 16 to define an imaging field. The light also passes through the optical wedge 12, 12' that changes the depth of field of the imaging field according to the selected operating thickness of the optical wedge 12, 12'. The image modification assembly 10 focuses the image on the image sensor 18.

In FIGS. 1a and 1b, the optical element 16 is a lens assembly and the image sensor 18 is preferably a CCD. Placing the optical wedge 12, 12' between the lens assembly 16 and the CCD 18 changes the focal length and depth of field of the optical system. In FIG. 1a, the optical wedge 12 has two distinct thicknesses where the preferred difference between the thicknesses is approximately 0.7 mm. As illustrated by FIGS. 1a and 1b and stated above, the optical wedge 12, 12' is moved in an east-west transverse direction with respect to the optical beam path 22. However, the disclosed embodiments may be modified such that the optical wedge 12, 12' moves in a north-south transverse direction, diagonal direction, or rotational direction with respect to the optical beam path 22.

Figure 1C:
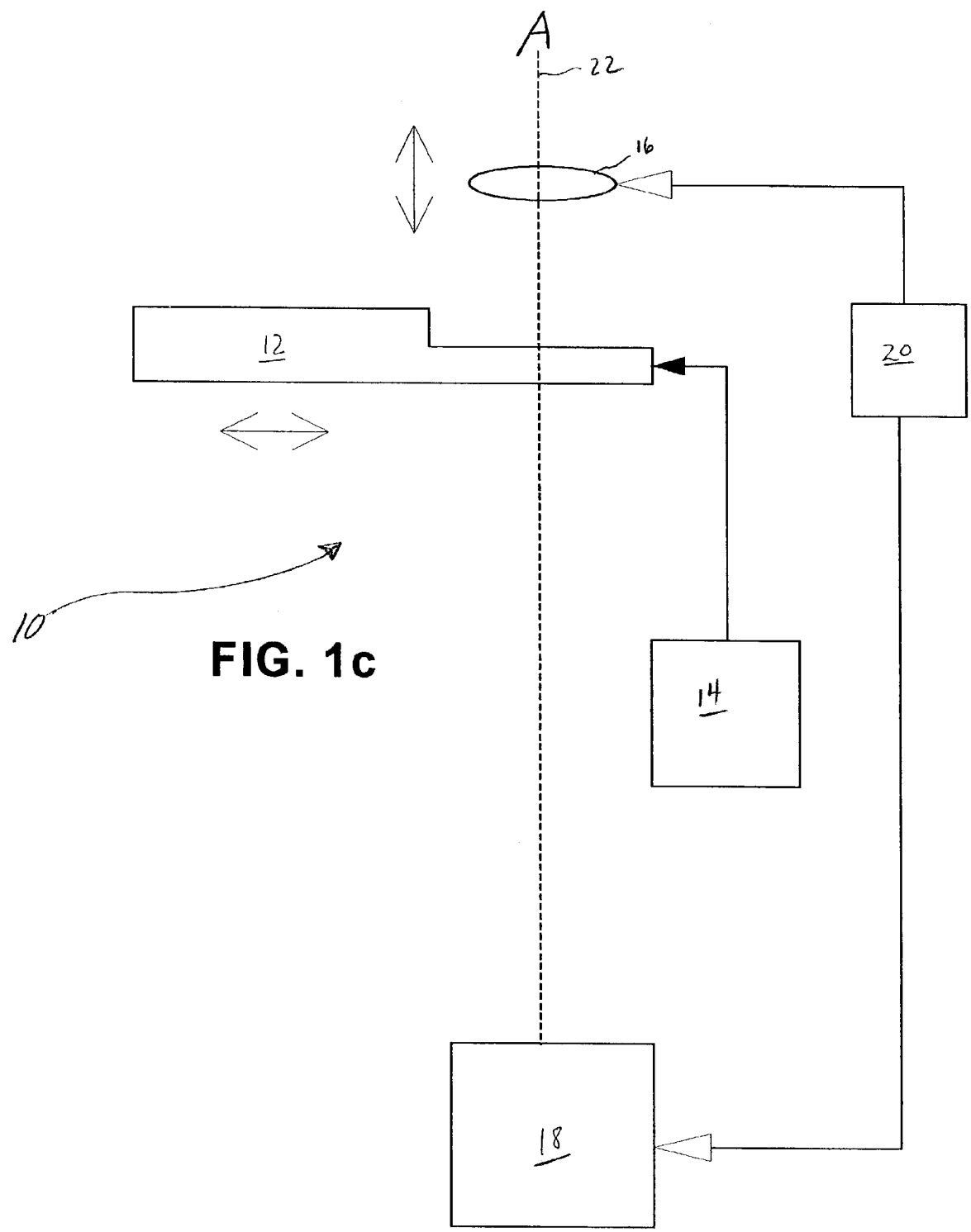
Figure 1D:
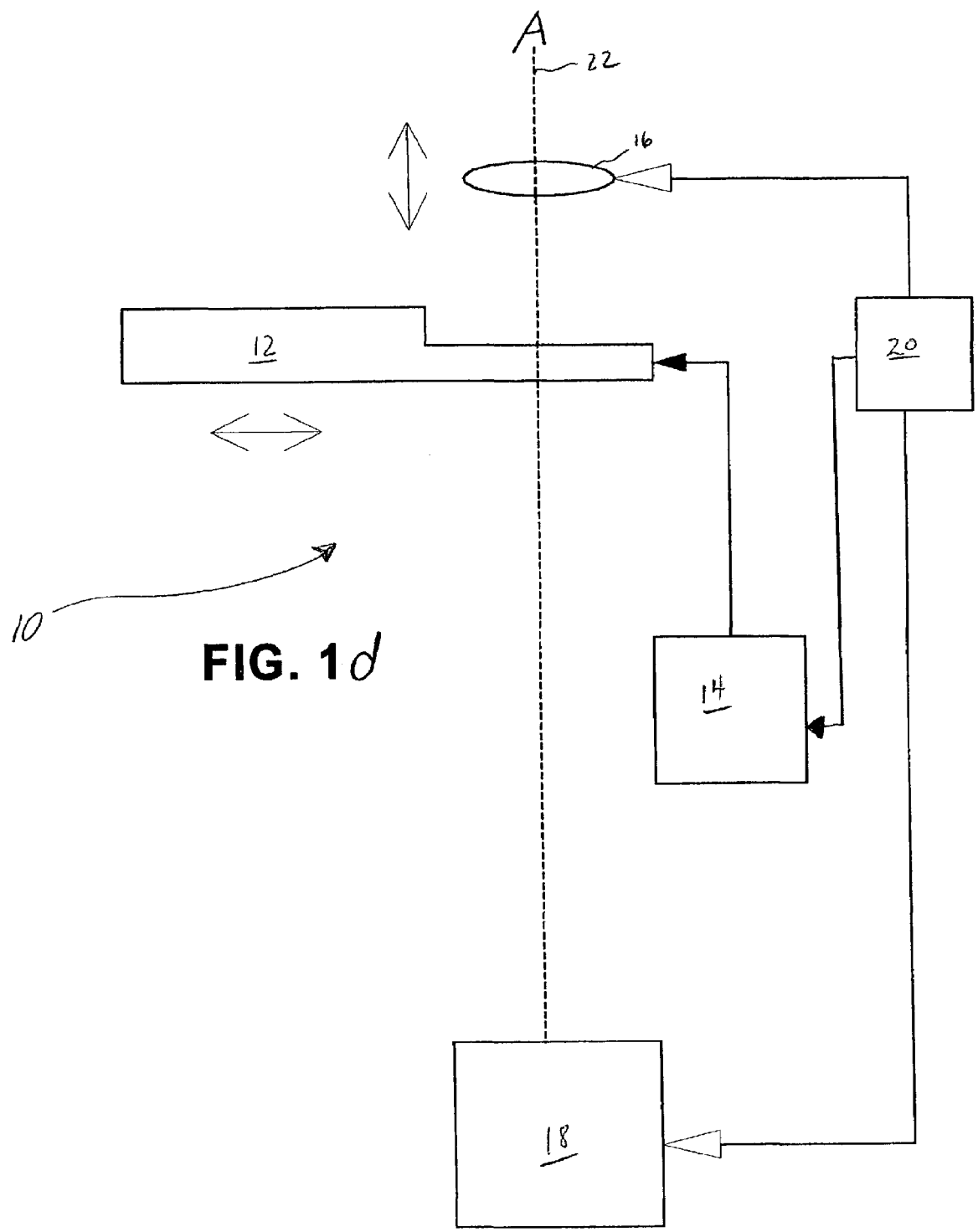
Figure 1E:
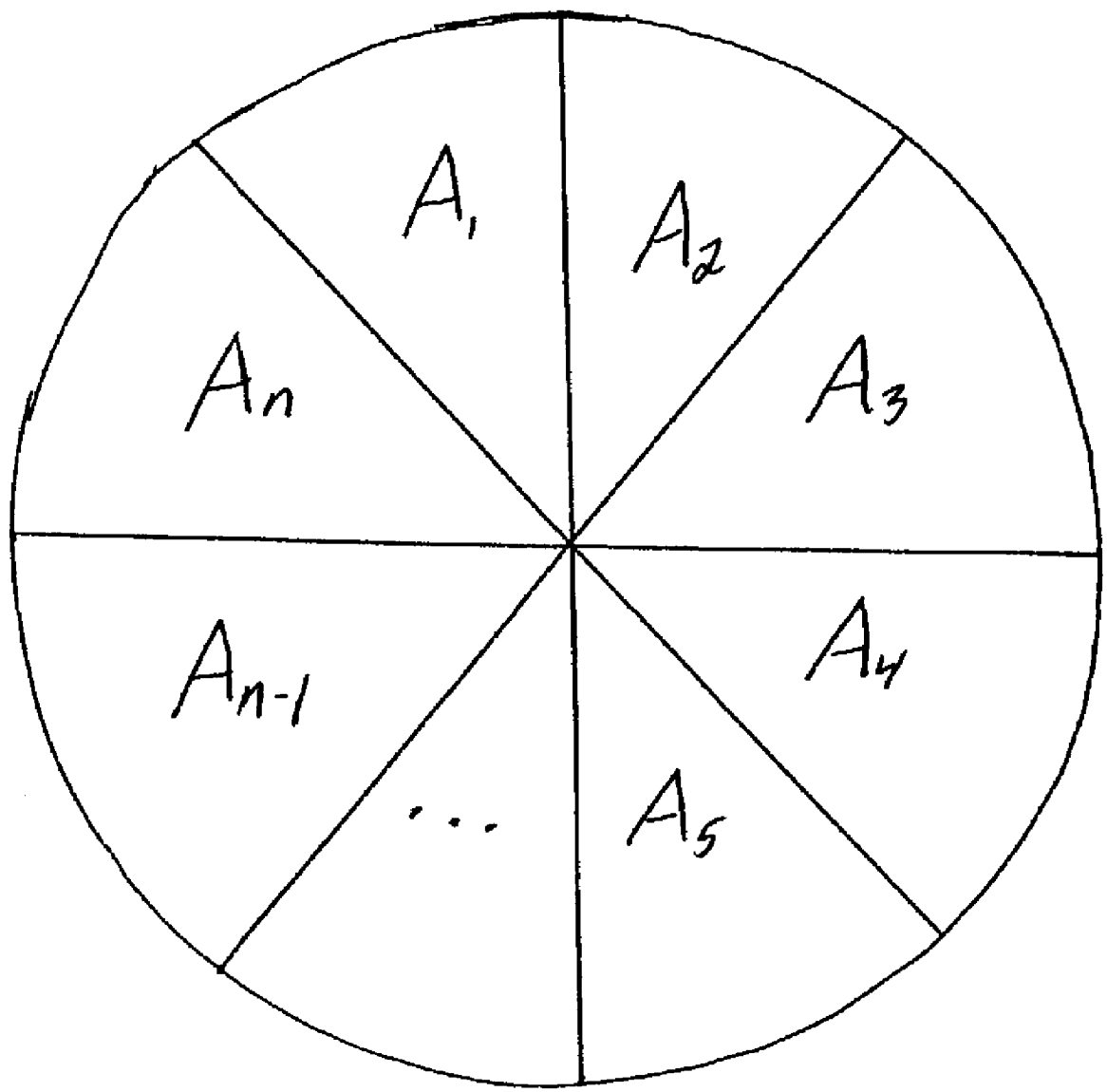
FIG. 1e depicts a plan view of a circular optical element having a plurality of portions having different thicknesses in accordance with the present invention.

With respect to movement of the optical wedge in a rotational direction with respect to the optical beam path 22, FIG. 1e depicts a plan view of a circular optical element capable of being substituted for the wedge 12, 12' and rotated by the actuator 14 in FIGS. 1a and 1b. The circular optical element is designated generally be reference numeral 50 and it includes a plurality of portions $A_1$–$A_n$ each having a different thickness corresponding to a different optical property, such as a different depth of field and focal length. As each portion is aligned with the optical beam path 22, the optical property of the optical system 10 changes accordingly.

FIG. 1c illustrates an embodiment where an image focusing assembly 20 is integrated with the optical system 10. The image focusing assembly 20 is operatively coupled to the lens assembly 16 and to the image sensor 18. In this embodiment, the image focusing assembly 20 automatically and/or manually (via control switches) adjusts a focus quality of the image by adjusting the position and/or orientation of the lens assembly 16 and/or the image sensor 18.

In particular, with continued reference to FIG. 1c, the image focusing assembly 20 is operatively coupled to the lens assembly 16 and moves the lens assembly 16 longitudinally along the optical beam path 22 to adjust a focus quality of an image impinged on the image sensor 18. The image focusing assembly 20 is also operatively coupled to the image sensor 18 for moving the image sensor 18 longitudinally along the optical beam path 22 and/or for adjusting the orientation of the image sensor 18 to change a focus quality of the image impinged on the image sensor 18. In another embodiment of the present invention as shown by FIG. 1d, the image focusing assembly 20 is operatively coupled to the actuator 14 of the image modification assembly 10 for automatically and/or manually controlling the depth of field and focus quality of the optical system 10.

In the embodiments described above with reference to FIGS. 1a–1d, a processing unit of a decoding board (see element 212 of FIGS. 5a and 5b) within an optical code reader or an external processing unit, for example, within a host terminal, monitors the image produced on the image sensor 18. The processing unit generates and transmits an output signal to the actuator 14 and/or the image focusing assembly 20 to automatically control the actuator 14 and/or the image focusing assembly 20 for automatically controlling the various parameters of the optical system 10, such as the focus quality of the image and the depth of field. It is contemplated that the processing unit adjust one or more parameters of the optical system in real-time according to the percentage of misreads or other factors.

Figure 2A:
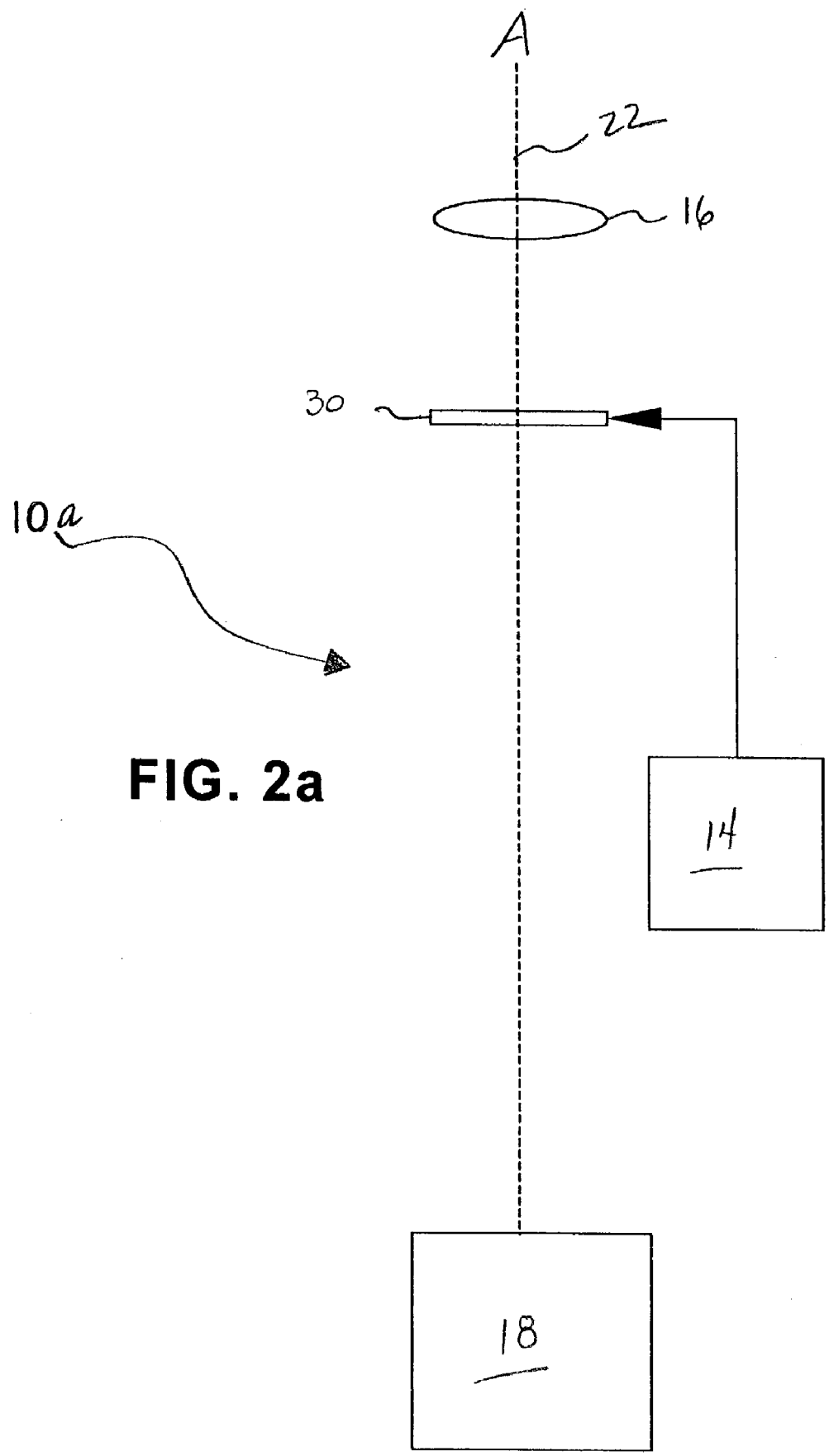
FIGS. 2a and 2b depict top plan views of components of an imaging engine in accordance with additional embodiments of the present invention.

In an additional embodiment of the present invention illustrated by FIG. 2a, an adjustable aperture assembly 30 changes the depth of field of the imaging field without altering the focal length of the optical system 10a. The adjustable aperture assembly 30 substantially aligns a central point of an aperture 32 (see FIG. 3a) with the optical beam path 22.

The diameter of the aperture 32 is changeable automatically or by a manual action, such as depression of a trigger of an imaging optical code reader, or the use of a diameter selector switch mechanically associated with the adjustable aperture assembly 30. The trigger and the diameter selector switch are preferably operatively coupled to an actuator 14a as known in the art. The actuator 14a in turn is operatively coupled to the adjustable aperture assembly 30 for changing the diameter of the aperture 32.

Figure 3A:
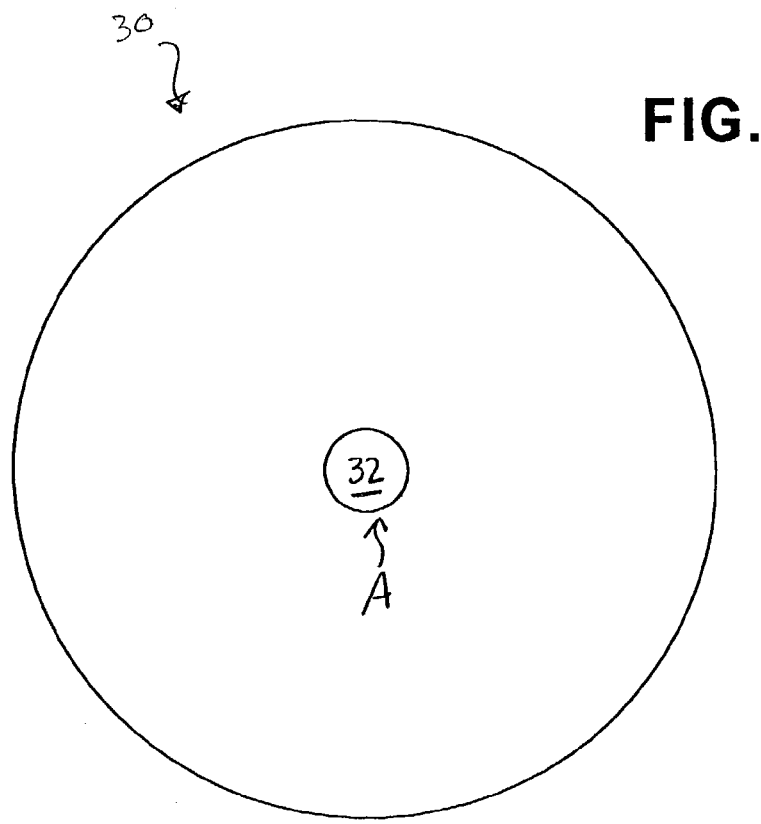
FIG. 3a depicts a front view of a multi-diameter aperture in a first position in accordance with the present invention.
Figure 3B:
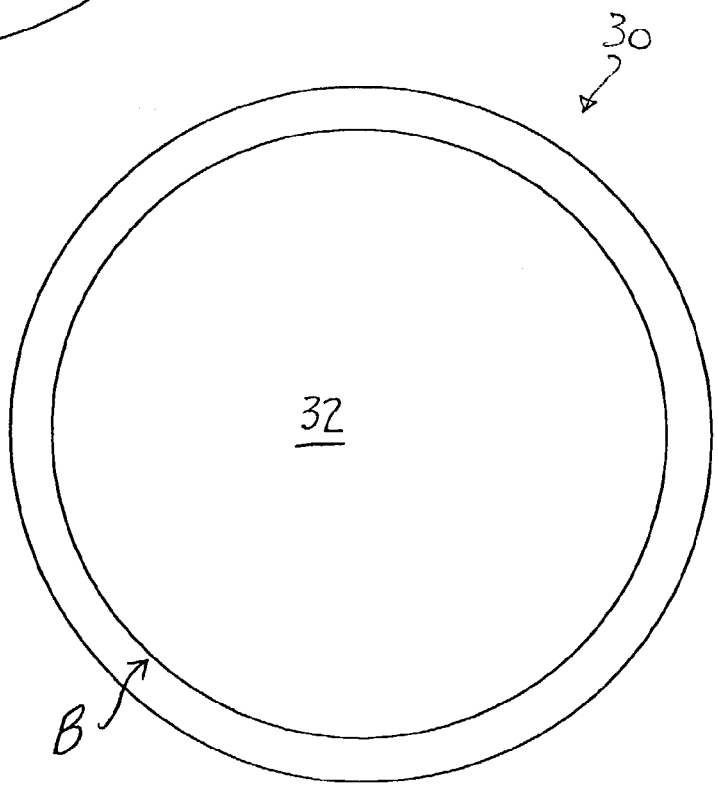
FIG. 3b depicts a front view of a multi-diameter aperture in a second position in accordance with the present invention.

Referring to FIGS. 3a and 3b, the adjustable aperture 32 has a minimum diameter and a maximum diameter. With a small diameter aperture, the optical system 10a has a longer depth of field, and conversely, when the aperture 32 has a large diameter, the optical system 10a has a shorter depth of field. Further, when the aperture 32 has a small diameter (FIG. 3a), it transmits less light than when it has a large diameter (FIG. 3b).

The adjustable aperture assembly 30 can have two different positions for defining corresponding first and second diameters of the aperture 32 and first and second depths of field. Alternatively, the adjustable aperture assembly 30 has a plurality of positions defining a plurality of aperture diameters and depths of field of the imaging field. Preferably, the adjustable aperture assembly 30 has a first position with a relatively large diameter (see FIG. 3b), defining a near depth of field for the optical system 10a. In a second position, the aperture 32 has a smaller diameter than the first position (see FIG. 3a), thereby lengthening the depth of field of the optical system 10a to define a far depth of field.

Figure 2B:
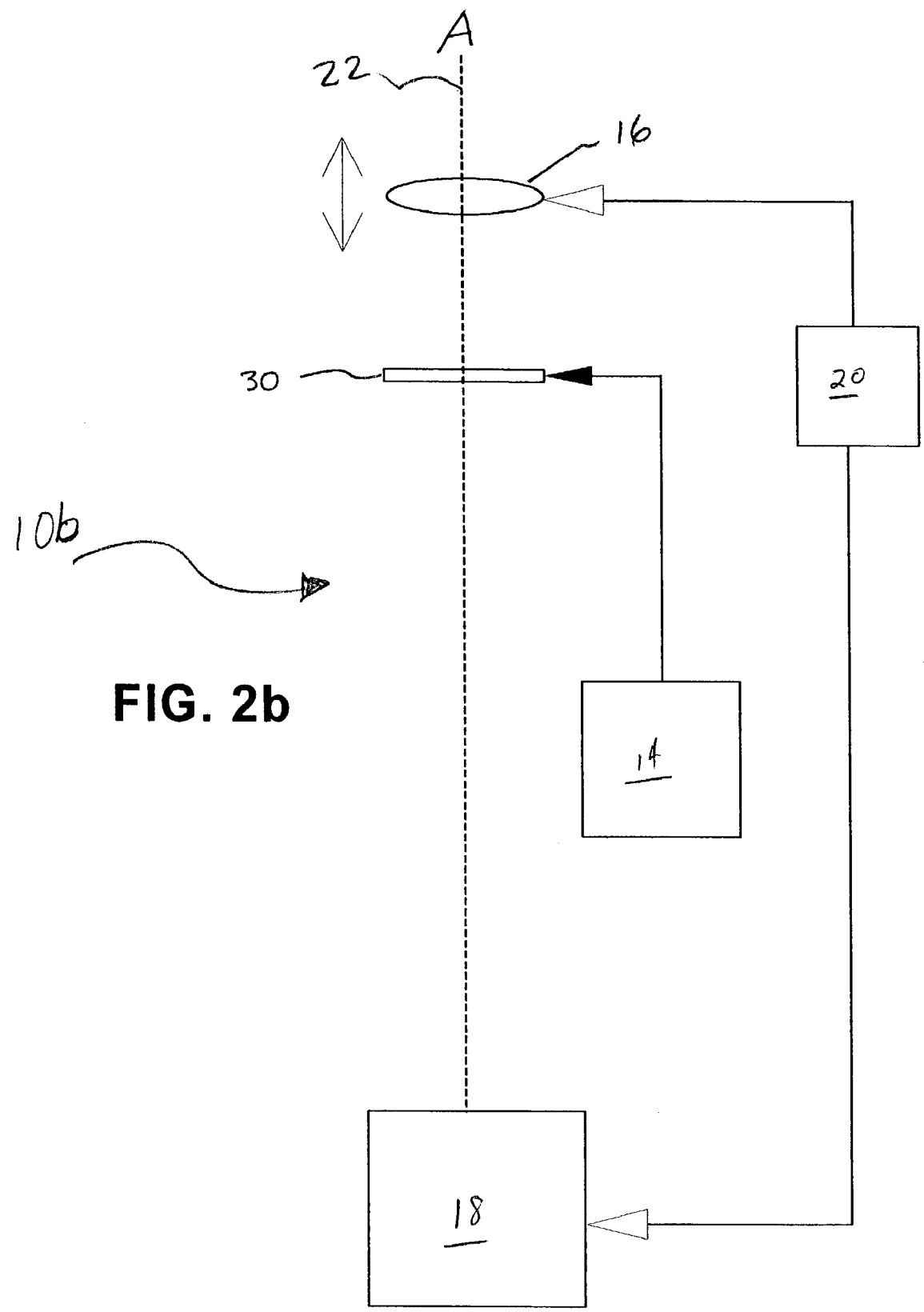

FIG. 2b illustrates an embodiment where an image focusing assembly 20 is integrated with an optical system 10b similar to optical system 10a. The image focusing assembly 20 is operatively coupled to the lens assembly 16 and to the image sensor 18. In this embodiment, the image focusing assembly 20 automatically and/or manually (via control switches) adjusts a focus quality of the image by adjusting the position and/or orientation of the lens assembly 16 and/or the image sensor 18.

In particular, with continued reference to FIG. 2b, the image focusing assembly 20 is operatively coupled to the lens assembly 16 and moves the lens assembly 16 longitudinally along the optical beam path 22 to adjust a focus quality of an image impinged on the image sensor 18. The image focusing assembly 20 is also operatively coupled to the image sensor 18 for moving the image sensor 18 longitudinally along the optical beam path 22 and/or for adjusting the orientation of the image sensor 18 to change a focus quality of the image impinged on the image sensor 18. It is contemplated that the image focusing assembly 20 can also be operatively coupled to the actuator 14 for automatically and/or manually controlling the depth of field and focus quality of the optical system.

In the embodiments described above with reference to FIGS. 2a and 2b, a processing unit of a decoding board (see FIGS. 5a and 5b) within an optical code reader or an external processing unit, for example, within a host terminal, monitors the image produced on the image sensor 18. The processing unit generates and transmits an output signal to the actuator 14 and/or the image focusing assembly 20 to automatically control the actuator 14 and/or the image focusing assembly 20 to control the various parameters of the optical systems 10a, 10b, such as the focus quality of the image and the depth of field. It is contemplated that the processing unit adjust one or more parameters of the optical systems 10a, 10b in real-time according to the percentage of misreads or other factors.

In each of above-described embodiments with reference to FIGS. 1a–2b, in an automatic mode, the depth of field of the imaging field is changed automatically by a control circuit having a processing unit coupled to the optical system or manually by the user. In manual mode, the user selects the desired depth of field of the imaging field by either manually actuating a trigger assembly on the optical code reader or actuating a selector switch on the optical code reader.

Figure 5A:
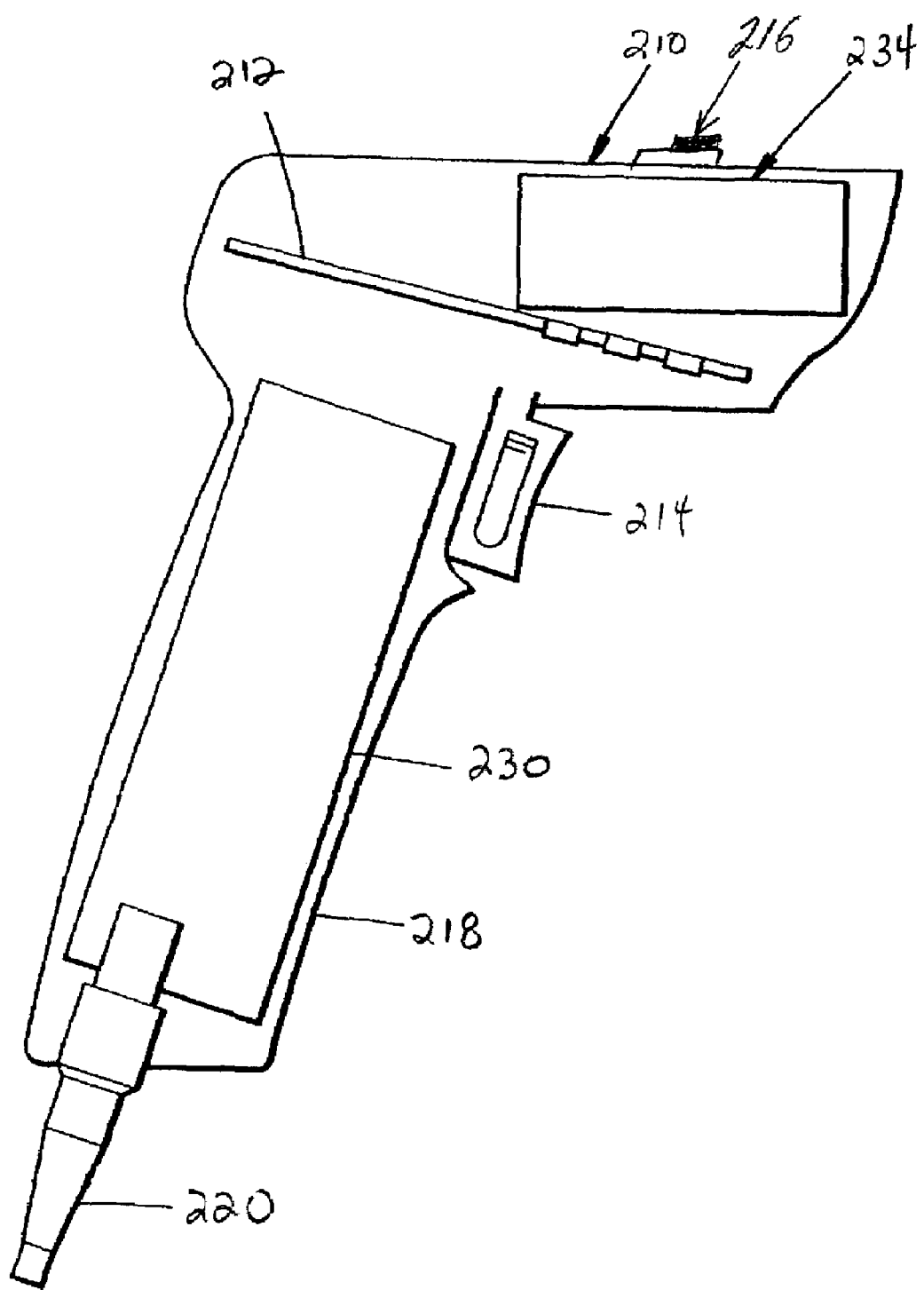
FIGS. 5a and 5b illustrate sectional views of handheld imaging optical code readers showing the imaging engine and other internal components in accordance with the present invention.
Figure 5B:
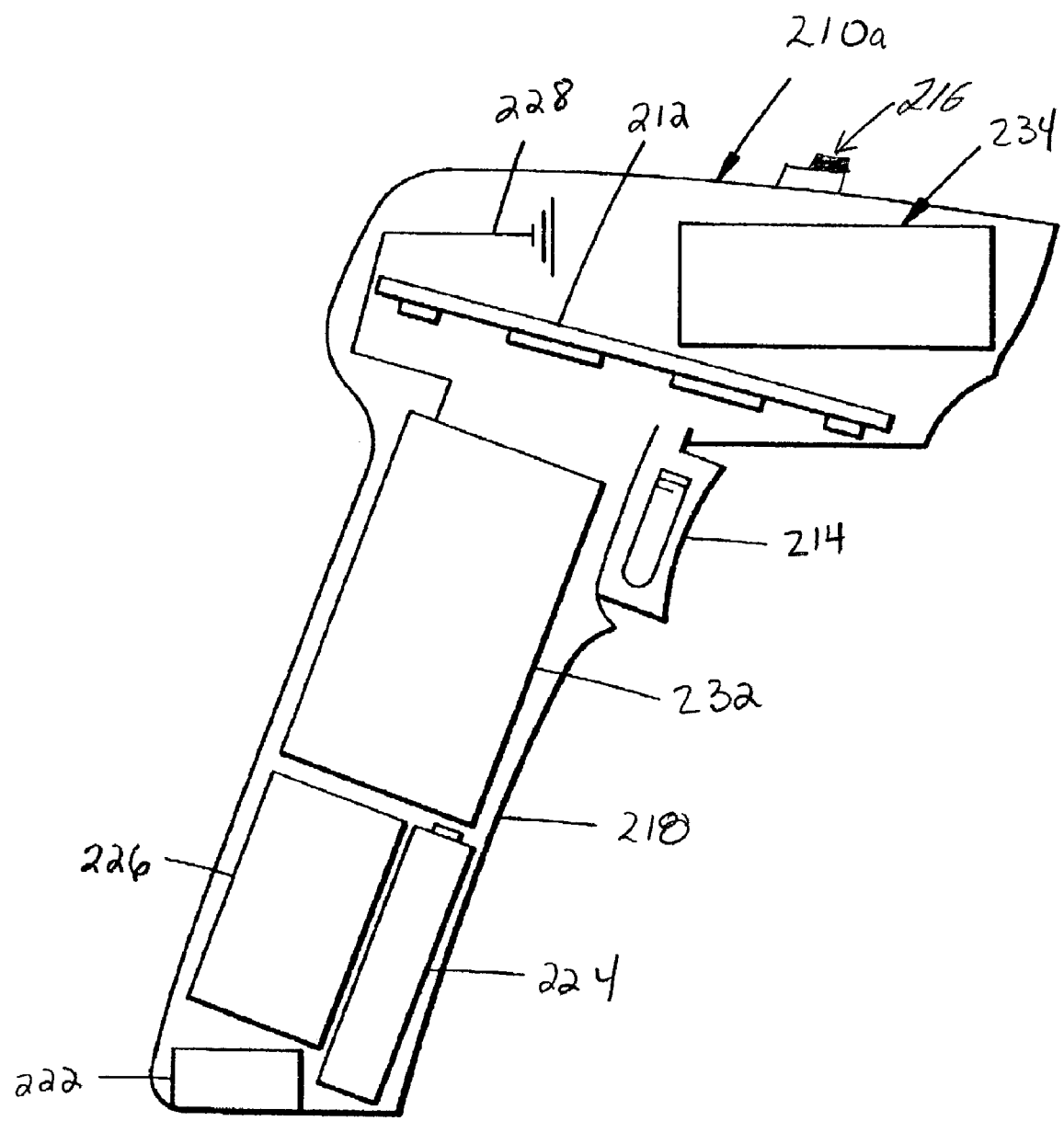

With reference to FIGS. 5a and 5b, manual actuation of the trigger assembly 214 or the selector switch 216 enables the actuator 14 to move the optical wedge 12 from a first position to a second position, and vice versa. For example, as shown by FIG. 1a, the optical wedge 12 will move from the first position to the second position or from the second position to the first position.

Manual actuation of trigger assembly 214 or selector switch 216 also moves the optical wedge 12' in FIG. 1b from any starting position to another position. By way of example, the optical wedge 12' in FIG. 1b may initially be in the third position when the trigger assembly 214 or the selector switch 216 is actuated. Responding to the actuation, the actuator 14 moves the optical wedge 12' to the fifth position. Other combinations of starting and ending positions are within the scope of this invention.

Similarly, the actuator 14 shown in FIGS. 2a and 2b adjusts the diameter of the adjustable aperture assembly 30 to effect a change in the diameter of aperture 32 in response to actuation of the trigger assembly 214 or the selector switch 216. An illustration of the adjustable aperture assembly 30 is depicted by FIGS. 3a and 3b. Starting in the first position ("A"), the actuator 14 moves the adjustable aperture assembly 30 to the second position ("B") when the trigger assembly 214 is actuated by the user. Alternately, the actuation of the trigger assembly 214 may cause the actuator 14 to move the adjustable aperture assembly 30 from the second position ("B") to the first position ("A").

Actuation of the actuator 14 will move the adjustable aperture assembly 30 from the first position to the second position or from the second position to the first position. It is within the scope of the invention that in either the manual or automatic modes of operation, the actuator 14 is capable of moving the adjustable aperture assembly 30 from a starting position to an ending position. The ending position defines a different diameter aperture than the starting position. Further, other positions besides the starting and ending positions define different-sized diameters for the aperture.

FIG. 4a illustrates a block diagram of an additional embodiment in accordance with the present invention for changing at least the depth of field of an optical system. In this embodiment, an optical system 150 having no moveable parts includes a first lens assembly 152 and a second lens assembly 154. Each of the lens assemblies 152, 154 preferably have different optical properties, such as different depths of field, fields of view and focal lengths. The lens assemblies 152, 154 include lenses manufactured in accordance with methods known to those of skill in the art, in order for the lens assemblies 152, 154 to have different optical properties.

As shown in FIG. 4a, the first lens assembly 152 has a first input optical axis 156 that directly impinges on the CCD 18. A fixed mirror 160 and an electronic mirror 162 divert a second input optical axis 158 of the second lens assembly 154 and cause it to selectively impinge on the CCD 18. The electronic mirror 162 changes rapidly between transparent and non-transparent states in response to voltage signals generated and transmitted to the electronic mirror 162 by control and logic circuitry 164.

The depth of field of the imaging field is changed selectively by switching between the two fixed lens assemblies 152, 154 oriented horizontally adjacent to each other, since each lens assembly provides a different imaging depth of field. The depth of field is selected to enable an optical code to be readily imaged and decoded.

As depicted in FIG. 4a, the electronic mirror 162 is positioned along a diagonal plane between the CCD 18 and the first lens assembly 152. If an imaging depth of field corresponding to the first lens assembly 152 is desired, the electronic mirror 162 is made transparent by transmitting a first voltage control signal from the control and logic circuitry 164 to the electronic mirror 162 via control path 166. Accordingly, the electronic mirror 162 becomes transparent and light passing through the first lens assembly 152 forms an image that is transmitted through the electronic mirror 162 and is impinged on the CCD 18.

If an imaging depth of field corresponding to the second lens assembly 154 is desired, the electronic mirror 162 is made non-transparent by transmitting a second voltage control signal from the control and logic circuitry 164 via control path 166. Accordingly, light reflected from the optical code or other external target passes through the second lens assembly 154 to form an image that is reflected by the fixed mirror 160 and the electronic mirror 162 before being impinged on the CCD 18.

When the electronic mirror 162 is in the reflective or non-transparent state, light passing through the first lens assembly 152 is reflected away from the CCD 18 and the fixed mirror 160. When the image formed by the second lens assembly 154 is desired, the electronic mirror 162 redirect incoming light from the first lens assembly 152 away from the image formed by the second lens assembly 154 to minimize degradation of the image.

An automatic mode of operation includes providing a processor (not shown) electrically coupled to the control and logic circuit 164. Actuation of the control and logic circuitry 164 and the resultant change of state of the electronic mirror 162 is controlled by a control signal generated and transmitted from the processor to the control and logic circuitry 164, if a no read condition or a misread condition is detected by the processor. The processor could be an internal processing unit of the optical code reader shown by FIGS. 5a and 5b, or an external processing unit, such as a processing unit within a host terminal in operative communication with the optical code reader. A manual mode of operation is described below.

In an alternative embodiment as shown by FIG. 4a, an optical system 150a is illustrated having the fixed reflective mirror 160 replaced by a second electronic mirror 162a operatively coupled to the control and logic circuitry 164. Stray light from the undesired image may adversely affect the image quality of the desired image. By incorporating two electronic mirrors, the effect of stray light from the undesired image is minimized. If the desired depth of field is capable of being provided by the first lens assembly 152, the control and logic circuitry 164 outputs a voltage signal that makes both electronic mirrors 162, 162a transparent. Therefore, the image formed by first lens assembly 152 passes through the electronic mirror 162 towards the CCD 18. The image formed by second lens assembly 154 passes through the other electronic mirror 162a and does not affect the image formed by the first lens assembly 152.

If it is desired to select the image formed by the second lens assembly 154, the control and logic circuitry 164 changes the voltage control signal 166 to make both electronic mirrors 162, 162a non-transparent, thereby causing the image to reflect off the electronic mirror 162a in the direction of electronic mirror 162. Since electronic mirror 162 is also in a reflective or non-transparent state, the image from the second lens assembly 154 is transmitted towards the CCD 18, while the image from the first lens assembly 152 is reflected away from the CCD 18, thereby preserving the image quality and integrity of the desired image.

In operation, the control and logic circuitry 164 controls the optical systems 150, 150a of FIGS. 4a and 4b for rapidly switching between different focal distances and/or different fields of view. Hence, the optical systems 150, 150a when incorporated within an optical code reader, as shown by FIGS. 5a and 5b, the reader can read various sized codes located at different distances from the code reader.

For example, the code reader in one operative mode of the optical systems 150, 150a can be used to read high-density barcode, i.e., a code having a minimum feature size of 4 mils at a 3" medium working distance. In such a case, the optical systems are controlled by the control and logic circuitry 164 to have a working depth of field of ±1½ to 2". Alternatively, the reader may read low-density code, i.e., a code having a 15 mil minimum feature size. In such a case, the optical systems are controlled to have a working depth of field of ±3". By controlling the working depth of field, the code can be imaged and decoded.

The embodiments illustrated in FIGS. 4a and 4b can be automatically or manually controlled for changing the depth of field of the imaging field. In a manual mode of operation, the trigger assembly 214 is operatively coupled to the control and logic circuitry 164 whereby actuation of the trigger 214 causes one or both of the electronic mirrors 162, 162a depending on the particular embodiment to change from a reflective state to a transparent state or from a transparent state to a reflective state. A selector switch, such as the selector switch 216, can also be used instead of the trigger assembly 214 for altering the state of the electronic mirrors 162, 162a.

As with the previously described embodiments of the present invention, the depth of field can be changed by the user manually actuating either the trigger assembly 214 or the selector switch 216. In the embodiments shown by FIGS. 4a and 4b, such actuation causes the control and logic circuitry 164 to change an output voltage transmitted to the electronic mirrors 162, 162a via voltage control path 166, thereby causing a change of state of the electronic mirrors 162, 162a. For example, if the electronic mirrors 162, 162a are initially in the reflective state, thereby transmitting light from the second lens assembly 154 to the CCD 18 as discussed previously.

By actuating the trigger assembly 214 or the selector switch 216, the user causes the control and logic circuitry 164 to change the output voltage provided to the electronic mirrors 162, 162a. This causes the electronic mirrors 162, 162a to change to the transparent state. When the electronic mirrors 162, 162a are in the transparent state, light is transmitted from the first lens assembly 152 through the electronic mirror 162 to the CCD 18. In a further alternate configuration, the control and logic circuitry 164 operates automatically to change the state of the electronic mirrors 162, 162a.

FIG. 5a is a sectional view of a handheld optical code reader 210 in accordance with the present invention illustrating the internal components thereof. One main internal component is an imaging engine 234 located on a top or head portion of the reader 210. The imaging engine 234 includes one or more of the optics and/or additional components of the various embodiments of the present invention disclosed herein.

A trigger circuit board 230 is located in the handle portion 218 of the handheld optical code reader 210. The trigger board 230 is electrically coupled and in electrical communication with switch means associated with the trigger assembly 214 of the handheld device. As a result the trigger board 230 receives and processes signals indicative of the operator depressing the trigger assembly 214 in order to initiate, or continue reading of optical codes.

A decoding board 212 (including a processing unit as referenced to above) is also provided to the optical code reader 210 adjacent to the imaging engine 234. A selector switch 216, as previously referred to, is provided to the reader 210 for selectively controlling the depth of field of the imaging engine 234.

In circumstances where the handheld optical code reader 210 of FIG. 5a is to be retrofitted from a laser line scan engine to an optical imaging engine, the imaging engine 234 and decoding board 212 are inserted in place of the line scan engine and associated circuit board in the handheld code reader 210. Accordingly, previously designed toolings, housings and host devices may be employed and provide continuity in upgrading the code reading system. The handheld reader 210 communicates with a host terminal (not shown) via electrical cable 220.

FIG. 5b is a sectional view of another preferred embodiment of a handheld optical code reader 210a in accordance with preferred embodiments of the present invention showing the location of the imaging engine 234 and the selector switch 216. This embodiment is battery powered and wireless.

A handle circuit board 232 is located in the handle portion 218 of the handheld optical code reader 210a. The handle board 232 is electrically connected to the trigger assembly 214 associated with the handheld device for receiving and processing signals indicative of the operator depressing the trigger assembly 214.

In addition to circuitry associated with the trigger assembly 214 and the selector switch 216, the handle portion 218 of the optical code reader 210a of FIG. 5b may contain a radio frequency board 226, including a transceiver and antenna, which provide a mobile radio link to one or more data terminals. Electrical power for the optical code reader may be provided by battery 224. An infrared data interface 222 (IRDA) or multi-contact shoe (not shown) may also be provided to communicate data between the optical code reader 210a and an external receiver or docking device, respectively. Compressed image data may be transmitted to the host terminal via a radio frequency link, IR communication link, or direct contact with the docking device.

In the embodiments shown by FIGS. 5a and 5b, the selector switch 216 is operatively coupled to the trigger circuit board 230 and the handle circuit board 232, or other internal components of the readers 210, 210a, for selecting the desired depth of field of the imaging field. The selector switch 216 is user actuated to choose between two or more different depths of field.

All embodiments of the present invention may additionally include a means for determining the distance between the handheld optical code reader and the target bar code. An example of a range determining means is disclosed in U.S. Pat. No. 6,123,264 to Li et al., the contents thereof are hereby incorporated by reference.

Furthermore, all embodiments may advantageously include a means for auto-focusing the handheld optical code reader. Examples of auto-focusing means for handheld optical code readers are disclosed in U.S. Pat. Nos. 5,796,089 and 5,920,060 to Marom, the contents thereof are hereby incorporated by reference. Accordingly, the structures disclosed in these two patents can be used to adjust the position and/or orientation of the image sensors of the embodiments described herein for adjusting the focus quality of the disclosed optical systems. Additional structures for adjusting the position of the image sensors and structures for moving the optical element 16 may include the structures disclosed in a U.S. Provisional Application filed on Dec. 18, 2002 and assigned U.S. Provisional Application No. 434,519, the contents of which are incorporated herein by reference.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. An optical system for an optical code reader comprising:
    first and second lens assemblies having respective first and second depths of field, and respective first and second input optical axes;
    at least one optical element having a transmissive state and a reflective state positioned in at least the first input optical axis to provide incident light from the first lens assembly to an image sensor when the at least one optical element is in the transmissive state and to provide incident light from the second lens assembly to the image sensor when the at least one optical element is in the reflective state; and
    control circuitry for applying a voltage to the at least one optical element for switching the at least one optical element between the transmissive and reflective states to switch between the first and second depths of field.

2. The optical system of claim 1, wherein the optical system is housed within the optical code reader, said optical coder reader comprising a trigger assembly in operative communication with the control circuitry, wherein manual actuation of the trigger assembly causes the applied voltage to change for changing the depth of field of the optical code reader.

3. The optical system of claim 1, wherein the optical system is housed within the optical code reader, said optical code reader comprising a switch in operative communication with the control circuitry, wherein manual actuation of the switch causes the applied voltage to change for selectively controlling the depth of field of the optical code reader.

4. The optical system of claim 1, wherein the optical system is a component of an imaging engine.

5. The optical system of claim 1, wherein the optical system is housed within the optical code reader, said optical code reader comprising means for decoding an optical code imaged by an image sensor of the optical system.

6. The optical system of claim 1, wherein the optical system is housed within the optical code reader, said optical code reader comprising means for determining a distance between the optical code reader and an optical code.

7. The optical system of claim 1, wherein the optical system is housed within the optical code reader, said optical code reader comprising means for auto-focusing to adjust a focus quality of the optical system.

8. An imaging system for reading an optical code comprising:
    a photo sensor employing an array of cells for producing electrical signals responsive to an image directed to said sensor;
    an optical system for directing images to the photo sensor, wherein the optical system includes at least one electrically operative optical element for electronically switching between at least two states to vary the optical properties of the image directed to the photo sensor, wherein the at least one optical element is at least one electronic mirror; and
    means for controlling the at least one electronic mirror to select an image of the optical code that is readily decodable.

9. The imaging system of claim 8, wherein the at least one optical element is switched between the at least two states to provide different depths of field.

10. The imaging system of claim 8, wherein the at least one optical element is switched between the at least two states to provide different focal distances.

11. The imaging system of claim 8, wherein the imaging system is housed within an optical code reader, said optical coder reader comprising a trigger assembly, wherein manual actuation of the trigger assembly causes the at least one electrically operative optical element to switch from one state to another state of said at least two states.

12. The imaging system of claim 8, wherein the imaging system is housed within an optical code reader, said optical code reader comprising a switch, wherein manual actuation of the switch causes the at least one electrically operative optical element to switch from one state to another state of said at least two states.

13. The imaging system of claim 8, wherein the imaging system is housed within an optical code reader, said optical code reader comprising means for decoding a read optical code.

14. The imaging system of claim 8, wherein the imaging system is housed within an optical code reader, said optical code reader comprising means for determining a distance between the optical code reader and an optical code.

15. The imaging system of claim 8, wherein the imaging system is housed within an optical code reader, said optical code reader comprising means for auto-focusing to adjust a focus quality of the imaging system.

16. A method of operation for an optical system, said method comprising:
    providing first and second lens assemblies having respective first and second depths of field, and respective first and second input optical axes;
    positioning at least one optical element having a transmissive state and a reflective state in at least the first input optical axis to provide incident light from the first lens assembly to an image sensor when the at least one optical element is in the transmissive state and to provide incident light from the second lens assembly to the image sensor when the at least one optical element is in the reflective state; and applying a voltage to the at least one optical element for switching the at least one optical element between the transmissive and reflective states to switch between the first and second depths of field.

17. The method of claim 16, further comprising providing a manually-actuated switch for manually causing the applied voltage to change for selectively controlling the depth of field.

18. The method of claim 16, wherein the optical system is a component of an imaging engine.

19. The method of claim 16, further comprising housing the optical system within an optical code reader, said optical code reader comprising means for decoding an optical code imaged by an image sensor of the optical system.

20. The method of claim 16, further comprising housing the optical system within an optical code reader, said optical code reader comprising means for determining a distance between the optical code reader and an optical code.

21. The method of claim 16, further comprising housing the optical system within an optical code reader, said optical code reader comprising means for auto-focusing to adjust a focus quality of the optical system.

22. A method of operation for an imaging system, said method comprising:

providing a photo sensor employing an array of cells for producing electrical signals responsive to an image directed to said sensor;

providing an optical system for directing images to the photo sensor, wherein the optical system includes at least one electrically operative optical element for electronically switching between at least two states to vary the optical properties of the image directed to the photo sensor, wherein the at least one optical element is at least one electronic mirror; and controlling the at least one electronic mirror to select an image of the optical code that is readily decodable.

23. The method of claim 22, further comprising housing the imaging system within an optical code reader, said optical coder reader comprising a trigger assembly, wherein manual actuation of the trigger assembly causes the at least one electrically operative optical element to switch from one state to another state of said at least two states.

24. The method of claim 22, further comprising housing the imaging system within an optical code reader, said optical code reader comprising a switch, wherein manual actuation of the switch causes the at least one electrically operative optical element to switch from one state to another state of said at least two states.

25. The method of claim 22, further comprising housing the imaging system within an optical code reader, said optical code reader comprising means for decoding a read optical code.

26. The method of claim 22, further comprising housing the imaging system within an optical code reader, said optical code reader comprising means for determining a distance between the optical code reader and an optical code and means for auto-focusing to adjust a focus quality of the imaging system.

* * * * *